United States Patent
Dingler et al.

(10) Patent No.: US 8,472,979 B2
(45) Date of Patent: Jun. 25, 2013

(54) SYSTEM AND METHOD FOR SCHEDULING AND RESERVATIONS USING LOCATION BASED SERVICES

(75) Inventors: John R. Dingler, Dallas, GA (US);
David C. Olds, Marietta, GA (US);
James R. Rudd, Charlotte, NC (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 12/173,584

(22) Filed: Jul. 15, 2008

(65) Prior Publication Data
US 2010/0015993 A1  Jan. 21, 2010

(51) Int. Cl.
*H04W 4/02* (2009.01)
*H04W 24/00* (2009.01)

(52) U.S. Cl.
USPC .................................. 455/456.3; 455/414.1

(58) Field of Classification Search
None
See application file for complete search history.

(56) References Cited

U.S. PATENT DOCUMENTS

| | | | |
|---|---|---|---|
| 6,414,635 B1 | 7/2002 | Stewart et al. | |
| 6,759,960 B2 | 7/2004 | Stewart | |
| 6,823,188 B1 | 11/2004 | Stern | |
| 2002/0095312 A1* | 7/2002 | Wheat | 705/1 |
| 2009/0167553 A1* | 7/2009 | Hong et al. | 340/825.29 |

FOREIGN PATENT DOCUMENTS

WO   WO03/067851   8/2003

* cited by examiner

*Primary Examiner* — Philip Sobutka
(74) *Attorney, Agent, or Firm* — Matthew Chung; Roberts Mlotkowski Safran & Cole, P.C.

(57) ABSTRACT

A system and method for providing reservation services to users of mobile devices. The system is implemented in a reservation computer device having computer executable code tangibly embodied on a computer readable medium. The reservation computer device is operable to prioritize a reservation schedule of a service establishment based on a route and projected arrival time of one or more subscribing users such that earlier arriving users and users that have already arrived at the service establishment are given priority in the reservation schedule regardless of prearranged reservations.

27 Claims, 6 Drawing Sheets

SYSTEM AND METHOD FOR SCHEDULING AND RESERVATIONS USING LOCATION BASED SERVICES

FIELD OF THE INVENTION

The invention generally relates to a system and method to provide reservation services to users of mobile devices and, in particular, a system and method for providing scheduling and reservation services using location based services.

BACKGROUND

Faced with an increasingly difficult challenge in growing both average revenue per user (ARPU) and numbers of subscribers, wireless carriers are trying to develop a host of new products, services, and business models based on data services. One such service is location services, which provides information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam;
Providing weather reports which are germane to the location where the user is using the mobile device, etc.

An advantage of using location services is that the mobile user does not have to manually specify ZIP codes or other location identifiers to use location-based services.

For the network carrier, location-based services provide value add[ed] by enabling services such as:

Resource tracking with dynamic distribution (e.g., taxis, service people, rental equipment, doctors, fleet scheduling, etc.);
Finding people or information for the user (e.g., person by skill (doctor), business directory, navigation, weather, traffic, room schedules, stolen phone, emergency 911);
Proximity-based notification (push or pull) (e.g., targeted advertising, buddy list, common profile matching (dating), automatic airport check-in); and
Proximity-based actuation (push or pull) (e.g., payment based upon proximity (EZ pass, toll watch).

In addition, location based services are convenient for sharing location data between wireless devices to wireless devices and from wireless devices to stationary devices like a home computer or stationary tracking system or content provider, etc. This would allow a third party to determine an exact location of a mobile user such as, for example, a family member, friend, employee, etc.

In view of the above, location based services can be a very powerful tool for both the end user and the network carrier. However, the full extent of location based services has not yet been realized by the industry. For example, there is no currently effective way to use the services to provide certain conveniences to the end user as well as a service establishment such as, for example, a restaurant. Take for example, the many instances when a person makes an appointment or reservation, but traffic or other issues delay the individual, or other instances when a person arrives to a location early only to wait for a service. In these instances, the service establishment may not be effectively using their resources such as, for example, maximizing their dining capacity. More specifically, knowing that an individual will be late or early for an appointment can prompt the service establishment, e.g., restaurant, to rearrange their reservation list to maximize seating capacity and hence revenue. However, currently the only known way to do this is by trusting the individual to keep the restaurant advised as to their expected arrival time. This, of course, is impractical as the individual will rarely, if ever, inform a restaurant, for example, that they are running either late or early.

Accordingly, there exists a need in the art to overcome the deficiencies and limitations described hereinabove.

SUMMARY

In a first aspect of the invention, a system implemented in a reservation computer device comprising computer executable code tangibly embodied on a computer readable medium. The reservation computer device is operable to prioritize a reservation schedule of a service establishment based on a route and projected arrival time of one or more subscribing users such that earlier arriving users and users that have already arrived at the service establishment are given priority in the reservation schedule regardless of prearranged reservations.

In another aspect of the invention, a method is provided on software, hardware or a combination of software and hardware. The method includes prioritizing a reservation schedule of a service establishment based on a route and estimate time of arrival of one or more users of a subscribing system. The priority is provided to the subscribing users that are early arriving users and users that have already arrived at the subscribing service establishment regardless of prearranged reservations.

In another aspect of the invention, a method is provided for deploying a location based service. The method comprises providing a computer infrastructure operable to at least adjust a reservation schedule of a service establishment using received route information which is used to estimate a time of arrival of subscribing and authenticated users during a predefined time window. The method also comprises prioritizing an order of service in the reservation schedule based on the estimated arrival time and actual arrival time of the subscribing users.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to a system and method to provide reservation services to users of mobile devices and, in particular, a system and method for providing scheduling and reservation services using location based services. In implementation, the invention provides a service establishment such as, for example, a restaurant, and an end user (of a mobile device) with a reservation tool to makes appointments and/or reservations based on traffic or other issues that may delay or accelerate the end user's arrival at the service establishment. For example, the system and method of the invention provides a reservation service to inform the restaurant of a cancellation, or late or early arriving patron. This will allow the restaurant the ability to rearrange its seating schedule to maximize capacity and hence revenue. In this way, the late arriving patron can be re-queued into the system, while early arriving patrons can be given priority. Also, in further implementations, the reservation system of the present invention can broadcast reservation openings to interested parties (for example, potential diners in the vicinity of a restaurant) to allow them to quickly query availability without the need to place a call or physically stop into the establishment.

Advantageously, the present invention can be used for different services. For example, the present invention can be used for restaurants, concerts or theater halls, sporting events, and other service oriented venues.

Overview of System

Figure 1:
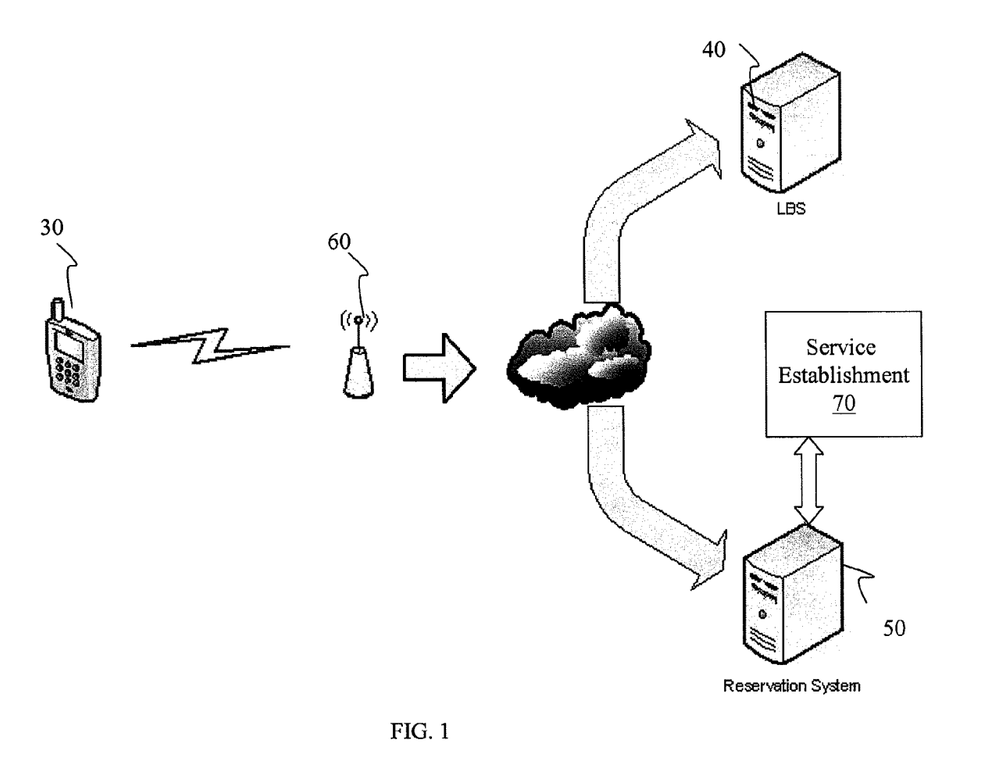
FIG. 1 shows a general schematic overview of an implementation of the present invention.

FIG. 1 shows a highly schematic architecture of the present invention. In embodiments, a mobile device 30 and a location based service 40 subscribe to a reservation service or system 50. In further embodiments, a service establishment 70 also subscribes to the services of the reservation system 50. The subscription can take on many different forms such as, for example, subscription, one time usage fee, periodic fee, etc. The service establishment 70 can be any service oriented venue such as, for example, a restaurant, but is equally applicable to other service venues such as theaters, sporting venues and other establishments which cater to patrons. In yet further embodiments, the mobile device 30 may also subscribe to the location based service 40; although this is not necessary in that mobile device 30 may have a resident agent (A-GPS) which can provide location based information directly to the reservation system 50.

The mobile device 30 may connect to the reservation system 50 via the Internet using instant messaging like with an internet messenger or SS7 signaling protocols by way of a carrier infrastructure 60. The former method of connection may provide non-SS7 based solutions like SIP, email and/or other IMS (IP multimedia subsystem) based protocols. The location based service 40 and service establishment 70 can connect with the reservation system 50 via the Internet or other wired and/or wireless links; any combination of one or more types of networks (e.g., the Internet, a wide area network, a local area network, a virtual private network, etc.); and/or utilize any combination of transmission techniques and protocols.

Once subscribed, the reservation system 30 can receive location information of an end user (mobile device) 30 from the location based service 40. Once the location and/or route of the mobile device 30 is known, the reservation system 50 can provide an anticipated arrival time of the patron to the service establishment 70, e.g., restaurant. In this way, the service establishment 70 can more efficiently utilize its resources. That is, the service establishment can calculate a new guest reservation queue in order to more efficiently serve its patrons. This can be used to provide priority, for example, to early arriving patrons, knowing that other patrons are being delayed or have canceled their reservations or make other types of adjustments, provide reminders or alerts to early and late arriving patrons, or adjust a user's priority if they are already at the location. This priority can be provided regardless of prearranged reservations of any of the patrons.

Also, in embodiments, the reservation system 50 can proactively broadcast messages to potential patrons passing with a predefined zone of the service establishment. This can be done by determining a users location and checking, e.g., restaurants with open reservations. Once the location is determined and certain accommodations are known to be available, the broadcast message can be sent to the mobile devices within a certain radius, e.g., 5 miles, of the service establishment. In response, the patron, e.g., mobile device 30, can send a seating request before entering the establishment therefore reserving a seat before actually entering into the establishment.

In embodiments, the location information can be obtained by an agent sitting locally on the mobile device, at a service provider or carrier infrastructure. The agent can be used to determine location information using many different methodologies. By way of one example, a local agent residing on the mobile device can use locally cached location information obtained by GPS, A-GPS or mechanisms other than the telecommunications network in order to determine location information. In other embodiments, the agent can obtain information from control plane locating, e.g., the service provider (e.g., network carrier) obtains the location based on the signal-strength of the closest cell-phone towers.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
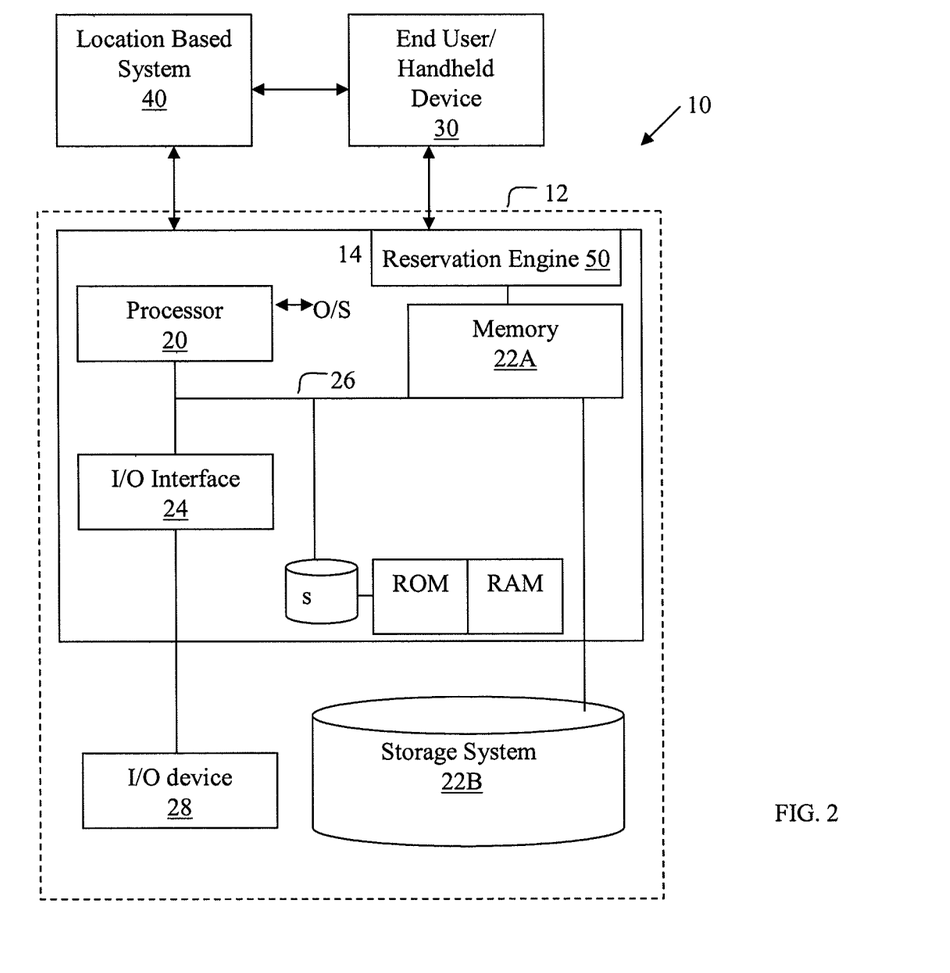
FIG. 2 is an illustrative environment for implementing the steps in accordance with the invention.

FIG. 2 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 2).

The computing device 14 includes a reservation engine (module or program control) 50 configured to make computing device 14 operable to perform the services described herein. In one example, both the mobile device 30 and the location based service 40 subscribe to the reservation services (reservation engine 50). In embodiments, it should be understood that the location based service can also be part of the computing device 14 and, as such, both services can be provided by, e.g., a network carrier or other service provider. Once subscribed, the mobile device 30 may connect to the reservation engine 50 and more specifically to the computing device 14 via the Internet or SS7 signaling protocols. The mobile device 30 may connect to the reservation system 50 via the Internet using instant messaging like with an internet messenger or other internet based solutions like SIP, email and/or other IMS protocols. The reservation engine 50 can receive location information of the mobile device 30 from the location based service 40 and, in turn, be provided with information such as, for example, anticipated arrival time of the patron, location of the patron, any delays the patron is encountering, etc. This will allow the service establishment to prioritize or adjust its reservation queue. Also, in embodiments, the reservation engine 50 can proactively send broadcast messages to potential patrons passing with a predefined zone of the service establishment.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the mobile device.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator or location based service (LBS), could offer to perform the processes described herein. In this case, the service provider can create, maintain, deploy, support, etc., the computer infrastructure that performs the process steps of the invention for one or more customers. These customers may be, for example, a mobile user or a third party such as a service establishment which requests information about the location and/or route of the mobile user. In return, the service provider can receive payment from the customer (s) under a subscription and/or fee agreement and/or the service provider can receive payment from the sale of advertising content to one or more third parties.

Exemplary Processes

Figure 3:
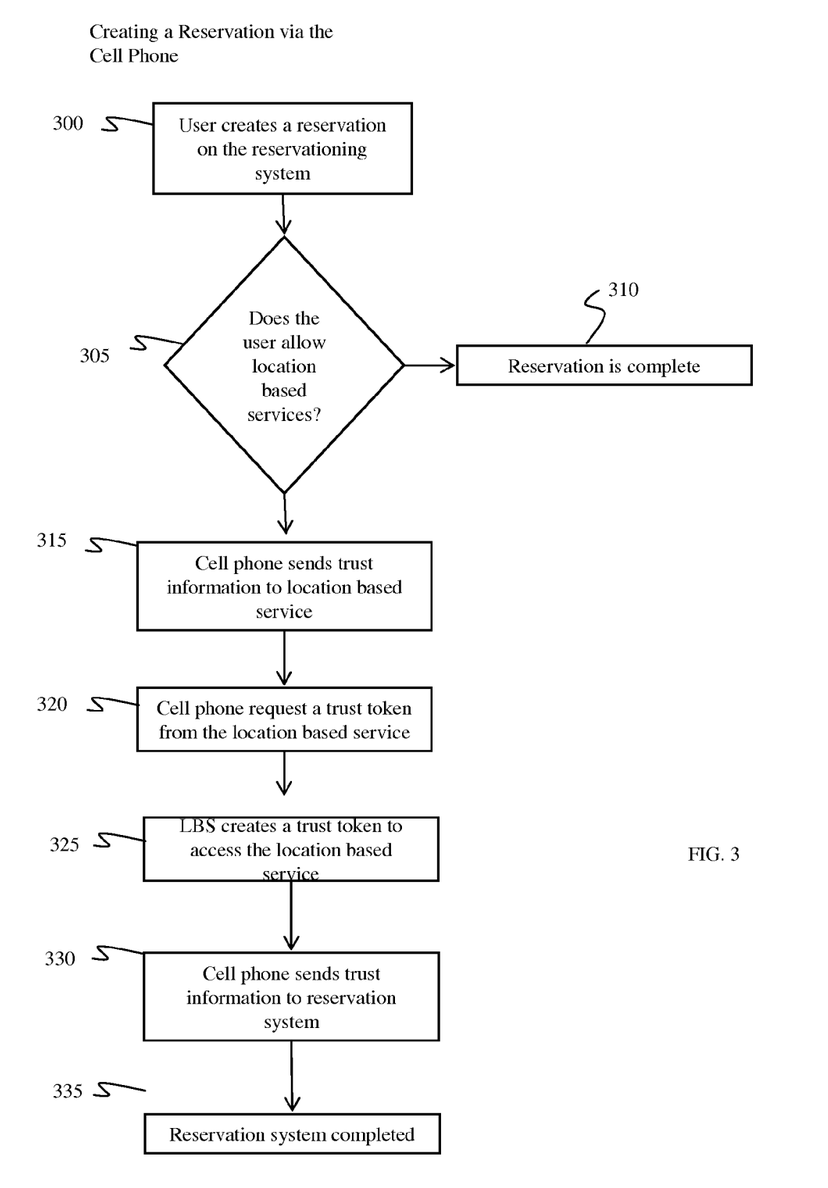
FIGS. 3-5 show flow charts of various exemplary processes in accordance with aspects of the invention.
Figure 4:
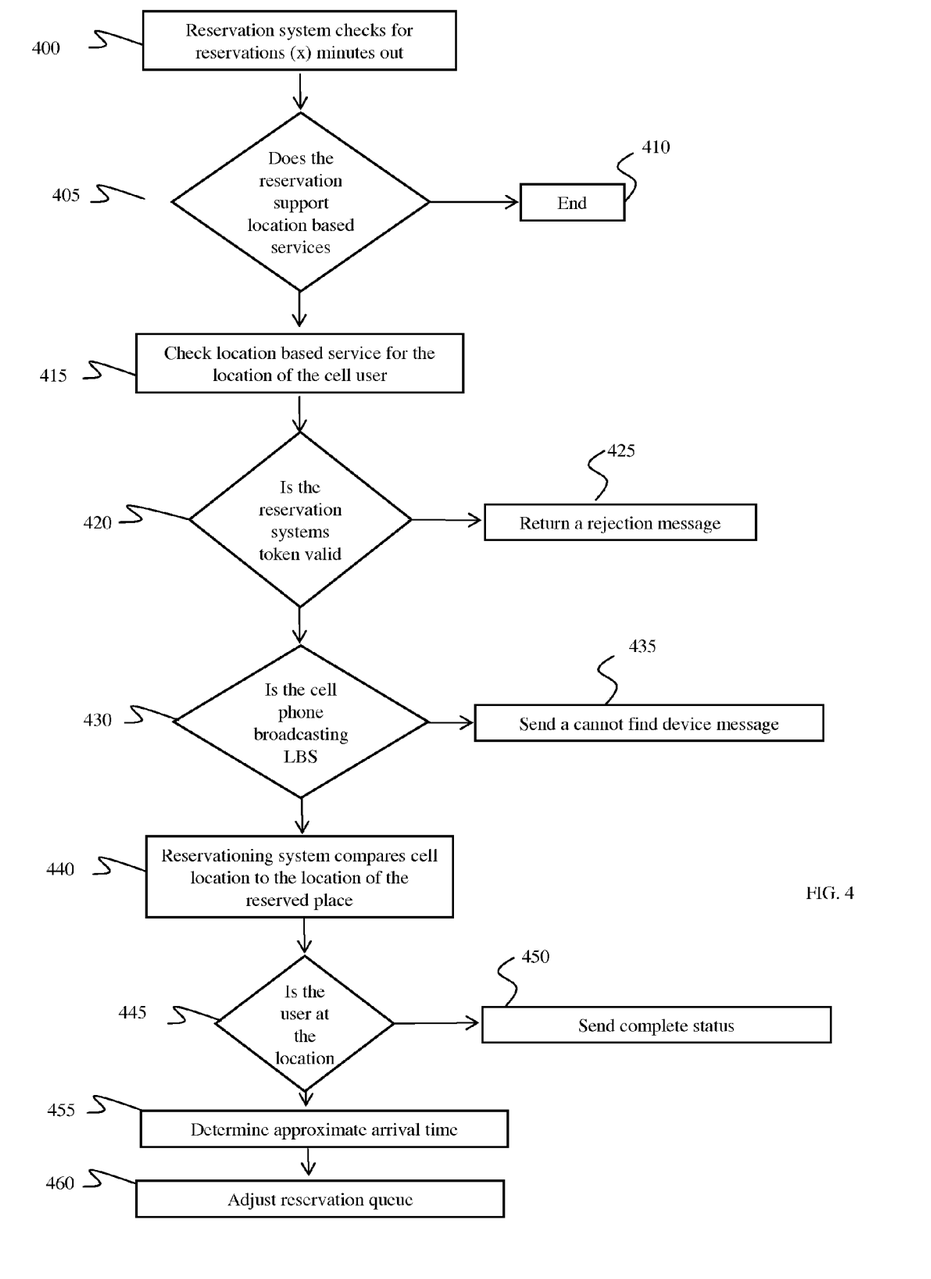
Figure 5:
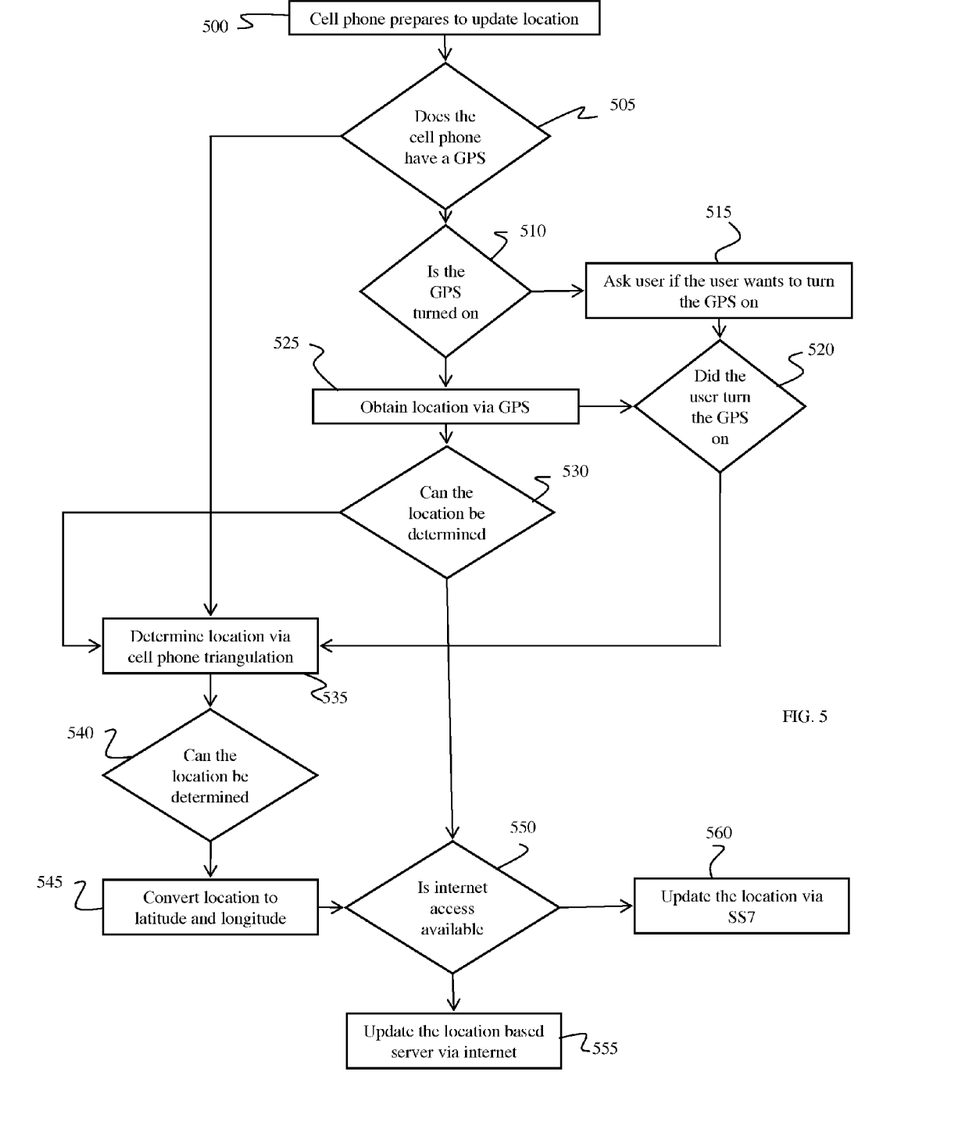

FIGS. 3-5 illustrate exemplary processes in accordance with the present invention. The steps of FIGS. 3-5 may be implemented on the computer infrastructure of FIG. 2, for example. The flow diagrams in FIGS. 3-5 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, as shown in FIG. 3, when the user places the reservation, the mobile device posts a parameter to the reservation system indicating that it is capable of location based services. The mobile device then sends a temporary token to the reservation system that allows the reservation system to track the user. This token can have an activation timestamp and expiration timestamp (as described with reference to FIG. 4) in order to create a queue as discussed in more detail below. Advantageously, this token allows the system to leverage the phone number or mobile device's unique identifier as the user name and use the token as the authorization.

More specifically, FIG. 3 illustrates an exemplary process to create a reservation in accordance with aspects of the invention. In particular, at step 300, a user (via a mobile device) creates a reservation using the reservation system by invoking a browser and beginning the reservation process. At step 305, a determination is made as to whether the user is subscribed to location based services and/or reservation services. If yes, at step 310, the reservation is completed. If not, at step 315, the mobile device sends trust information to the location based system. At step 320, the mobile device requests a trust token from the location based service. At step 325, the location based service creates a trust token in order for the mobile device to access the location based service. At step 330, the mobile device sends the trust token to the reservation system. At step 335, the reservation system completes the reservation.

In further embodiments, the location based service will allow a requesting system to find the user's location during a time window determined by the activation and expiration of a timestamp. For example, the reservation system can check what reservations are "x" minutes away. The reservation system can then check which reservations are capable of location tracking. Once it determines which reservations are trackable, the system can query the location of a user using the stored token created by the location based service and sent to the reservation system. The location based service will accept requests from the reservation system for the window of the token. Once the token is validated, the system tries to determine the location of the user. The location based service can be transaction based (web service) or publish/subscribe based (MQ/JMS). If the location based service cannot find the location of the device it returns a rejection.

More specifically, at step 400, the reservation system checks for reservations "X" minutes away. "X" can be any preconfigured predetermined time period such as, for example, 10 minutes, 20 minutes, etc. At step 405, a determination is made as to whether the reservation supports location based services. If not, at step 410, the process ends. If the reservation system does support the location based services, at step 415, the system checks the location based service for the location of the user. In embodiments, as discussed above, the location based services may be eliminated, if the mobile device has a resident agent which can provide the location based information of the user.

At step 420, a determination is made as to whether the reservation system token of the user is valid. If not, at step 425, a rejection message is returned. The processes can then continue at any of steps 325 or 330 of FIG. 3, for example, in order for the user to establish a token. If a token is found to be valid, at step 430, a determination is made as to whether the mobile device is broadcasting the location based information. If not, at step 435, a "cannot find" or similar message will be sent to the service establishment and/or the end user.

If the mobile device is broadcasting location based information, at step 440, the reservation system compares the location of the mobile device to a location of the reserved establishment. At step 445, a determination is made as to whether the user is at the location of the reserved establishment. If yes, a send complete status is sent at step 450. If not, at step 455, the system will determine an estimated arrival time. At step 460, the reservation queue will be adjusted accordingly.

Referring to FIG. 5, from the perspective of the mobile device, there are two ways to update and send its location. The first method is to use GPS and the second method is to use cell tower triangulation. In addition, the mobile device may be out of coverage range for Internet service, but still have SS7 capabilities. Accordingly, the system and method of the present invention is designed to handle such different contingencies in order to update location and reservation information.

More specifically, at step 500, the mobile device prepares to update its location information. At step 505, a determination is made as to whether the mobile device has GPS capabilities. If so, at step 510, a determination is made as to whether the GPS capabilities are activated. If not, at step 515, the system requests the user to activate the GPS capabilities. At step 520, a determination is made as to whether the user activated the GPS. If so, at step 525, the location of the mobile device is obtained via the GPS capabilities.

At step 530, a determination is made as to whether the location of the mobile device can be obtained. If the location cannot be obtained by GPS (at step 530) or it is determined that the user does not have GPS capabilities (at step 505) or the user did not activate the GPS capabilities (at step 520), the processes converge at step 535. At step 535, the location of the mobile device is determined using tower triangulation methods. At step 540, a determination is made as to whether the triangulation methods can determine the location of the mobile device. If so, at step 545, the location information is converted to longitudinal and latitudinal coordinates.

If the location of the mobile device can be determined using GPS at step 530 or continuing from step 545, a determination is made as to whether there is any Internet access available to the mobile device. If there is Internet access, the mobile device will transmit its location information via the Internet at step 555. Otherwise, if not, the mobile device will transmit its location information via SS7, at step 560.

The conversion for the mobile device triangulation can occur locally on the mobile device or via a service call that sends to a web service a cell towers' UID and signal strength. In embodiments, the web service update can maintain a consistent queue, but if SS7 is used the locations may come to the location based service out of order. For this reason, the present invention, as discussed herein, timestamps each location which allows the system and method to adjust the queue accordingly.

Figure 6:
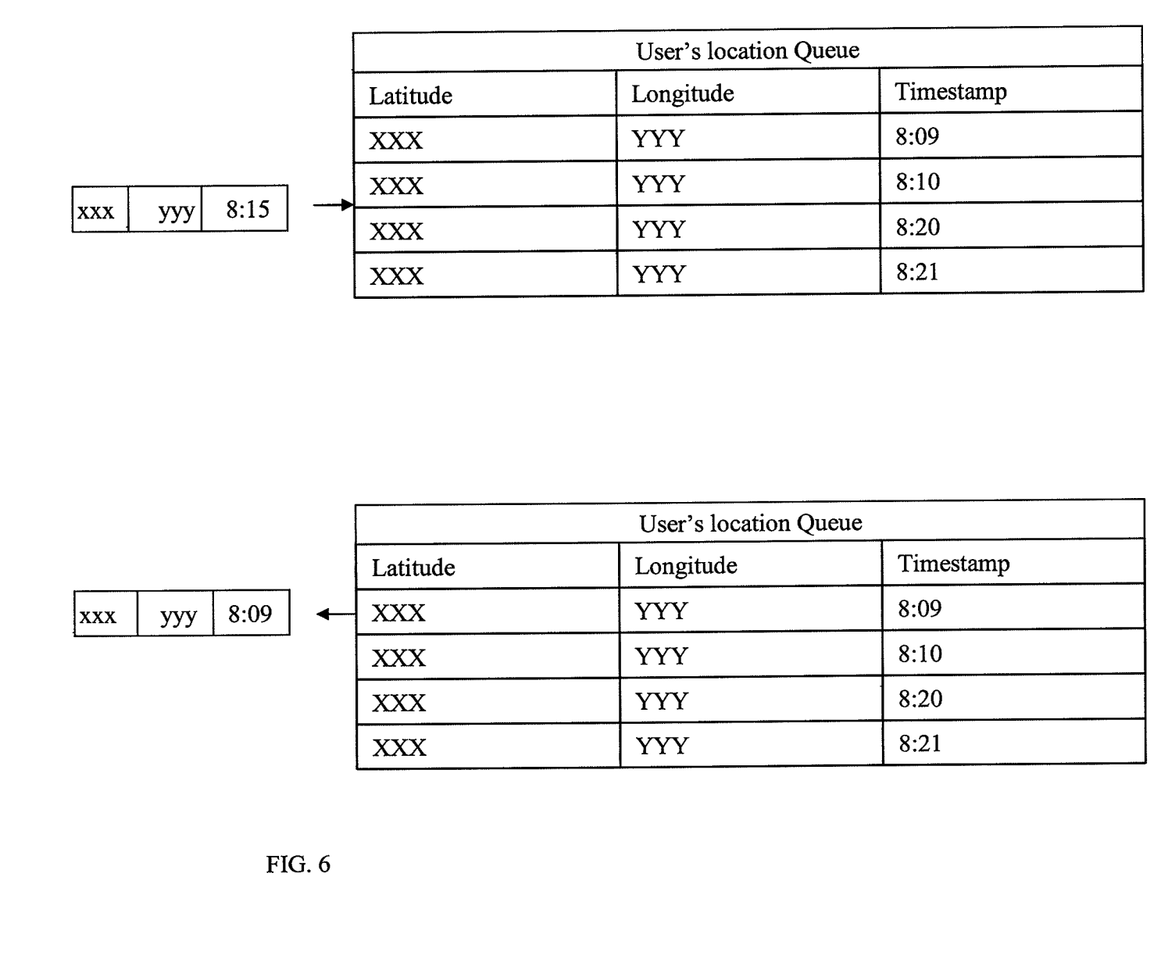
FIG. 6 shows an exemplary queue in accordance with the present invention.

For example, as shown in FIG. 6, when location information is received via SS7, the location information e.g., latitude and longitude, can be time stamped and placed in a queue. For example, as shown in FIG. 6, location information is time stamped at 8:15. This information is placed in the queue, with the oldest location information, e.g., location information with a time stamp of 8:09, being removed from the queue. The reservation system can use the last location of the mobile device to determine if the user is within an alert range, e.g., five miles, etc. Also, at each predetermined threshold, e.g., at a 5 mile radius, 2 mile radius, etc. the reservation system can alert the service establishment via a page, sms, email or display that a reservation has arrived or a mobile device is within the range of the threshold. Thus, the system and method of the present invention can locate the position of the mobile device (user) and adjust the reservation queue according to the time/distance the customer is to the service establishment. Similarly, the reservation system can alert or send a broadcast message to the mobile device indicating that the user(s) is within range of a service establishment, as they pass through any or all of the threshold points. The broadcast reservation can also be used to in the event that patrons may be late or are "no-shows" such that other interested patrons can activate the reservation feature showing reservation availability and wait time of potential, e.g., restaurants in the area. The system of the present can also aggregate multiple reservation availabilities based on proximate location on a single view, so that the user can easily and quickly see a list of reservation availabilities.

In embodiments, when the system and method of the present invention checks for current reservations within a given window, the reservation system can retrieve the stored token for that reservation and query its internal database to see if it needs to perform an update by checking the last update timestamp. Once the system has checked the timestamp, it can retrieve all reservations that require an update. For example, the following is pseudo code showing such process.

```
If (userlocation!= destineationLocation ){
DTL = Determinetimetolocation( ); //prior art common in GPS units
QueueTime = DistanceLocation + ReservationTime
}
```

Table 1 shows a queue table in accordance with the invention. Once the queue time has been established, it can be used to adjust the reservation via a priority queue, for example. This allows the reservation system to give preference to patrons whose queue time is equal to their reservation time, but automatically adjust reservations for patrons who may be running late.

TABLE 1

| Device | Party Name | Reserved Time | Time to Location | Distance to Location | Queue Time | Last Update |
|---|---|---|---|---|---|---|
| 5555551212 | John | 8:10 | 20 min. | 5 miles | 8:30 | 7:45 |

As one illustrative example shown in Table 2 below, John and Matt have arrived at the location for their reservation. Since Matt's reservation time and queue time are equal, Matt will receive priority over Jim, who is delayed and missed his original reservation. Also, as seen from the table below, Paul is the latest, and he has been placed at the bottom of the reservation because his queue time is the latest.

TABLE 2

| Device | Party Name | Reserved Time | Time to Location | Distance to Location | Queue Time | Last Update |
|---|---|---|---|---|---|---|
| 5555551212 | John | 8:10 | 0 | 0 miles | 8:30 | 7:45 |
| 5555551213 | Matt | 8:15 | 0 | 0 miles | 8:15 | 7:45 |
| 5555551214 | Jim | 8:10 | 30 min. | 4 miles | 8:15 | 7:45 |
| 5555551215 | Paul | 8:10 | 40 min. | 5 miles | 8:25 | 7:45 |

Although the system and method of the present invention (reservation system) looks for the queue time and reserved time to be equal, the reservation system can be configured to allow a patron a "grace" period before they would be re-queued. For example, a grace period of five minutes could be set that if the queue time is greater than or equal to the reservation time plus the grace period.

In embodiments, as discussed, the reservation system can be based on a subscriber defined threshold, and can notify other users of a new estimated time of arrival (ETA). The reservation system would calculate the new ETA and then calculate the difference from the previous ETA. If the ETA is greater than a predefined value a page is sent out to the owner of the reservation and the patron. This will also apply to groups of attendee's should the owner of the reservation be part of a group.

In embodiments, a time lag can be introduced into the calculations of route time. This accounts for possible stops during the route, traffic, road work or general slowdowns not accounted for in a general velocity equation. The time lag equation can be written:

$$\text{Time to arrive} = \text{zone 1}(\text{distance remaining/speed}) + \text{zone } n(\text{distance remaining/speed}) + \text{timelag} + ((\text{known stops} * \text{duration})),$$

where n is the zone number.

Accordingly, the velocity of the user can be used for many different purposes. For example, the system can leverage a location queue to determine the velocity of the user; leverage a velocity queue to minimize data needed from the user; or leverage a velocity queue to determine if the user has stopped moving by iterating through the points in the queue. This information can then be used to adjust reservation queues, lists, etc.

In embodiments, the time lag will be configured in nominated units to account for stops on a route, e.g., traffic signals. This time lag can be user defined or system defaulted. In embodiments, known stops such as, for example, road work, detours, etc. can be calculated from department of transportation (DOT) information or other road condition monitoring organizations. The full route can be calculated or segment time can be calculated for frequent updates.

In further embodiments, the system can attempt to locate the mobile device and its route based on the "911 method." As one of skill in the art knows, the 911 method uses a combination of position points received from the mobile device and an algorithm to approximate the route that is being taken. The user (patron) of the mobile device can then be adjusted in the queue based on the proximity of the customer to the restaurant and the estimated time of arrival.

In further embodiments, the reservation system can be sent the direction that the user (mobile device) is traveling, but this information may not be available using the triangulation method. The reservation system, though, can determine the effective direction by comparing the last location to the previous location in the queue. Feeds from DOT data or other road condition monitoring organizations can be used to augment the travel calculation by the location based services. If the reservation system uses multiple location points in the queue, it can use those points to map a history of the user and predict the route the user will use or better fit the user to the roads the user is using. Velocity prediction can also be used in conjunction with a rules engine to determine if the user is likely to travel in the same direction for a period of time, as the mobile device may only provide period updates (compared to live feeds).

The present invention also contemplates the user (e.g., mobile device) being able to opt out of the service. This can be accomplished by the use of a, e.g., "hotkey", which can be used to override the reservation notification. This can prevent a notification from being sent out, or can hide the mobile device from notifications.

In conclusion, the present invention provides many advantages. These advantages include, amongst other features discussed herein:

update location information via SS7 or an internet connection;
adjust the seating time of the reservation or the seating priority based on the user's location;
remind a user of a reservation;
cancel a reservation if the user cannot meet the appointment time;
adjust a user's priority if they are already at the location;
inform the owner or user groups in the reservation system when a subscriber (patron) gets within a given range or ranges;
sequence latitude and longitude based on a timestamp/queue driven system;
leverages a location queue to determine the velocity of the user;
leverages a velocity queue to minimize data needed from user;
leverage a velocity queue to determine if the user has stopped moving by iterating through the points in the queue;
create a time based token with an activation and expiration window for the location tracking;
implement notification based on users schedule;
leverage feeds from DOT applications to anticipate travel conditions and map information;
introduce hotkey activation and deactivation of the notification stream;
broadcast reservation availability to other interested parties via mobile devices such as cellular telephones in the event users are late or are "no-shows" for a reservation. (Other interested parties would activate this feature showing reservation availability and wait time of potential restaurants in the area; and/or
aggregate multiple restaurant reservation availability based on proximate location on a single view, so that the user can easily and quickly see a list of restaurant reservation availabilities.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A system implemented in a reservation computer device comprising computer executable code tangibly embodied on a non-transitory computer readable medium being operable to prioritize a reservation schedule of a service establishment based on a route and projected arrival time of one or more subscribing users such that earlier arriving users and users that have already arrived at the service establishment are given priority in the reservation schedule regardless of prearranged reservations.

2. The system of claim 1, wherein the reservation computer device is operable to proactively broadcast reservation availability to potential patrons passing with a predefined zone of one or more subscribing service establishments.

3. The system of claim 2, wherein the reservation computer device is operable to query or receive a seating request from one or more of the potential patrons and to adjust the reservation schedule based on the seating request.

4. The system of claim 3, wherein the reservation computer device is operable to determine reservation availability based on the route and projected arrival time of one or more subscribing users.

5. The system of claim 1, wherein the reservation computer device is operable to provide a priority queue table based on receipt of a message from the one or more users using SS7 signaling protocols.

6. The system of claim 5, wherein:
the priority queue table is structured to provide the reservation computer device with an ability to prioritize the reservation schedule, and the reservation computer device is operable to:
provide a preference for a reservation to a user of the one or more users whose queue time is equal to a prearranged reservation time; and
provide a grace period of a predetermined time prior to re-queuing in the reservation schedule the user.

7. The system of claim 1, wherein the reservation computer device is operable to take into account a route time in prioritizing the reservation schedule based on a lag time equation.

8. The system of claim 7, wherein the lag time equation is:

$$\text{Time to arrive} = (\text{zone } 1(\text{distance remaining}/\text{speed}) + \text{zone } n(\text{distance remaining}/\text{speed}) + \text{timelag} + (\text{known stops}*\text{duration})),$$

where n is the zone number.

9. The system of claim 1, wherein the prioritizing of the reservation schedule is provided after the one or more users have been authenticated.

10. The system of claim 1, wherein computer executable code tangibly embodied on a computer readable medium is operable to receive messages from the one or more users via the Internet or SS7 signaling protocols.

11. The system of claim 1, wherein the reservation computer device is at least one of supported, deployed, maintained, and created by a service provider.

12. The system of claim 1, wherein the computer infrastructure is operable to take into account a route time in prioritizing the reservation schedule based on a lag time equation.

13. The system of claim 12, wherein the lag time equation is:

$$\text{Time to arrive} = (\text{zone } 1(\text{distance remaining}/\text{speed}) + \text{zone } n(\text{distance remaining}/\text{speed}) + \text{timelag} + (\text{known stops}*\text{duration})),$$

where n is the zone number.

14. A method provided on software, hardware or a combination of software and hardware, comprising:
prioritizing a reservation schedule of a service establishment based on a route and estimate time of arrival of one or more users of a subscribing system, wherein priority is provided to the subscribing users that are early arriving users and users that have already arrived at the subscribing service establishment regardless of prearranged reservations.

15. The method of claim 14, further comprising authenticating the one or more users prior to the prioritizing.

16. The method of claim 14, further comprising time stamping the received location information in order to place the received location of the one or more users in a queue table.

17. The method of claim 16, wherein the receiving location information is via SS7 signaling protocols.

18. The method of claim 16, wherein the queue table is updated by removing an oldest of the time stamped received location information.

19. The method of claim 16, further comprising allowing a requesting system to find the user's location during a predetermined time window.

20. The method of claim 16, further comprising broadcasting reservation availability of one or more service establishment to the subscribing users.

21. The method of claim 14, wherein prioritizing the reservation schedule is based on a lag time equation.

22. The method of claim 21, wherein the lag time equation is:

$$\text{Time to arrive} = (\text{zone } 1(\text{distance remaining}/\text{speed}) + \text{zone } n(\text{distance remaining}/\text{speed}) + \text{timelag} + (\text{known stops}*\text{duration})),$$

where n is the zone number.

23. A method for deploying a location based service, comprising providing a computer infrastructure being operable to at least adjust a reservation schedule of a service establishment using received route information which is used to estimate a time of arrival of subscribing and authenticated users during a predefined time window and prioritizing an order of service in the reservation schedule based on the estimated arrival time and actual arrival time of the subscribing users.

24. The method of claim 23, wherein the received route information is received by SS7 signaling protocols with a time stamp and placed in a queue table in a chronological order of other entries in the queue table based on the time stamp such that an earliest of the received route information is deleted.

25. The method of claim 23, further comprising providing a broadcast message of open reservation slots based on cancellations, late arriving patrons and early arriving patrons of the subscribing and authenticated users.

26. The method of claim 25, wherein the broadcast message is provided to potential patrons passing with a predefined zone of one or more subscribing service establishments.

27. The method of claim 23, wherein the computer infrastructure is at least one of supported, deployed, maintained, and created by a service provider.

* * * * *